United States Patent
Burts-Cooper et al.

(10) Patent No.: US 7,538,972 B2
(45) Date of Patent: May 26, 2009

(54) INTERNALLY REPLENISHED ENCLOSURE

(75) Inventors: Ellen Burts-Cooper, Woodbury, MN (US); Robert C. Fitzer, North Oaks, MN (US); Daniel B. Pendergrass, Jr., Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 671 days.

(21) Appl. No.: 11/122,835

(22) Filed: May 5, 2005

(65) Prior Publication Data

US 2005/0264926 A1 Dec. 1, 2005

Related U.S. Application Data

(60) Provisional application No. 60/574,370, filed on May 25, 2004.

(51) Int. Cl.
*G11B 33/14* (2006.01)
(52) U.S. Cl. .................. 360/97.02; 141/4; 141/51; 720/648
(58) Field of Classification Search ............ 141/4, 141/51; 360/97.02; 720/648, 649, 651
See application file for complete search history.

(56) References Cited

U.S. PATENT DOCUMENTS

| | | | |
|---|---|---|---|
| 2,797,201 A | 6/1957 | Veatch et al. | |
| 2,892,508 A | 6/1959 | Kohman et al. | |
| 3,030,215 A | 4/1962 | Veatch et al. | |
| 3,184,899 A | 5/1965 | Frazier | |
| 3,365,315 A | 1/1968 | Beck et al. | |
| 4,211,537 A * | 7/1980 | Teitel ................. | 60/772 |
| 4,367,503 A | 1/1983 | Treseder | |
| 4,618,525 A | 10/1986 | Chamberlain et al. | |
| 4,767,726 A | 8/1988 | Marshall | |
| 5,293,286 A * | 3/1994 | Hasegawa et al. ........ | 360/97.02 |
| 5,636,081 A | 6/1997 | Higashiya et al. | |
| 5,756,936 A | 5/1998 | Viebranz et al. | |
| 6,317,286 B1 | 11/2001 | Murphy et al. | |

(Continued)

FOREIGN PATENT DOCUMENTS

EP 0 186 380 A2 7/1986

(Continued)

OTHER PUBLICATIONS

Schober, "Solid state ionics applications in vacuum technology", Elsevier, Solid State Ionics 144 (2001) 379-386.

(Continued)

*Primary Examiner*—Timothy L Maust
*Assistant Examiner*—Nicolas A Arnett
(74) *Attorney, Agent, or Firm*—Thomas M. Spielbauer (57) ABSTRACT

Internally replenished gas-containing enclosures are described. Such enclosures include a replenishing gas source internal to the enclosure, wherein the gas source comprises a gas contained within a permeable membrane. Exemplary gas sources include a plurality of bubbles and pouches. Materials useful for the permeable membrane include glass, glass ceramics, metals, metal oxides, polymeric films, as well as combinations of such materials. The gas source may be located within the enclosure or it may be incorporated into a resin (e.g., an adhesive or a gasket) positioned between sections of an enclosure. Methods of internally replenishing an enclosure are also described.

18 Claims, 3 Drawing Sheets

U.S. PATENT DOCUMENTS

| | | | |
|---|---|---|---|
| 6,392,838 B1 | 5/2002 | Hearn et al. | |
| 6,560,064 B1 | 5/2003 | Hirano | |
| 6,644,362 B2 | 11/2003 | Bernett | |
| 6,683,747 B2 | 1/2004 | Bernett | |
| 2002/0106501 A1 | 8/2002 | Debe | |
| 2003/0026033 A1* | 2/2003 | Fioravanti et al. | 360/75 |
| 2003/0165663 A1* | 9/2003 | Christopherson et al. | 428/137 |
| 2003/0223148 A1 | 12/2003 | Macleod et al. | |
| 2005/0270690 A1* | 12/2005 | Gunderson | 360/97.02 |

FOREIGN PATENT DOCUMENTS

WO    WO 03/041081 A1    5/2003

OTHER PUBLICATIONS

Product Literature: Conduct-O-Fil Silver-Coated Hollow Glass Spheres, Conduct-O-Fil® Conductive Additives, Potters Industries, Inc. (Date unknown but believed to be prior to the date of filing of the present application).

Vacuum Technology, Roth, A., North Holland Publishing Co., pp. 164 and 166 (1976).

* cited by examiner

INTERNALLY REPLENISHED ENCLOSURE

CROSS REFERENCE TO RELATED APPLICATION

This application claims the benefit of U.S. Provisional Patent Application No. 60/574,370, filed on May 25, 2004.

FIELD

The invention pertains to internally replenished gas-containing enclosures and methods of internally replenishing an enclosure. The invention is particularly useful in computer hard disk storage devices.

BACKGROUND

Gas-containing enclosures may be advantageous in a variety of applications. Generally, an enclosure is formed by connecting two or more sections using, e.g., mechanical fasteners, welds, or adhesives. One or more components are placed within the enclosure, and the enclosure is filled with a gas or gases, e.g., an inert gas. The completed enclosure contains the gas environment and one or more components protected by the enclosure.

For example, some hard disk drives are protected within an enclosure. The enclosure itself is generally located in an air environment, while the interior of the enclosure is filled with an inert gas (e.g., helium). Generally, the helium environment within the hard disk drive enclosure reduces both the energy required to spin the platters and the sensitivity of the head to ambient pressure fly height. The helium environment also may allow manufacturers to build drives with a lower fly height, leading to faster data access and retrieval rates.

The joints where the sections of an enclosure are connected are susceptible to leaks allowing gases within the enclosure to leave and/or ambient gases to enter the enclosure. In some applications, the enclosure may be sealed using, e.g., adhesives, gaskets and/or seals to minimize or substantially eliminate the flow of gases between the ambient environment and the interior of the enclosure. However, gases may diffuse through the materials used to seal the enclosure (e.g., the adhesives and gaskets). Whether by leaking, diffusion, or some other mechanism, the relative amount of desired gas within the enclosure generally diminishes over time.

Generally, to be effective, the desired gas environment within the enclosure should be maintained for the life of the components, which may be years (e.g., two, three, or five years, or even longer). Therefore, it is often desirable to replenish the gas within the enclosure to extend its useful life. One method of replenishment requires breaking a connection between sections of the enclosure, refilling the enclosure with gas, and resealing it. Another method includes equipping the enclosure with a fill-port and using an external gas supply to replenish the environment within the enclosure. Both methods may require removing the enclosure from its use environment for filling, or providing additional space around the enclosure to provide access. The presence of the fill port also presents a greater opportunity for leaks and may require additional gaskets or seals with their potential to permit diffusion of the desired gas out from the enclosure, and/or diffusion of ambient gases into the enclosure.

Another replenishment source comprises an impermeable storage tank for holding the gas, one or more valves to permit gas to exit the tank, and a series of controls to operate the valve(s). While the use of such devices may not require opening the enclosure or the presence of a fill port, the size, weight, and complexity of such devices may be undesirable in many applications.

SUMMARY

The present inventors have developed a gas source comprising a permeable membrane that will internally replenish the gas environment within an enclosure.

Briefly, in one aspect, the present invention provides an internally replenished enclosure comprising a gas source internal to the enclosure, wherein the gas source comprises a gas contained within a permeable membrane.

In some embodiments, the gas source comprises a plurality of bubbles.

In some embodiments, the permeable membrane comprises a glass or glass/ceramic.

In some embodiments, the permeable membrane comprises a metal and/or metal oxide coated glass or glass/ceramic.

In some embodiments, the bubbles are blended into a resin.

In some embodiments, the gas source includes a pouch comprising a polymeric film and optionally a metal and/or metal oxide coating.

The above summary of the present invention is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
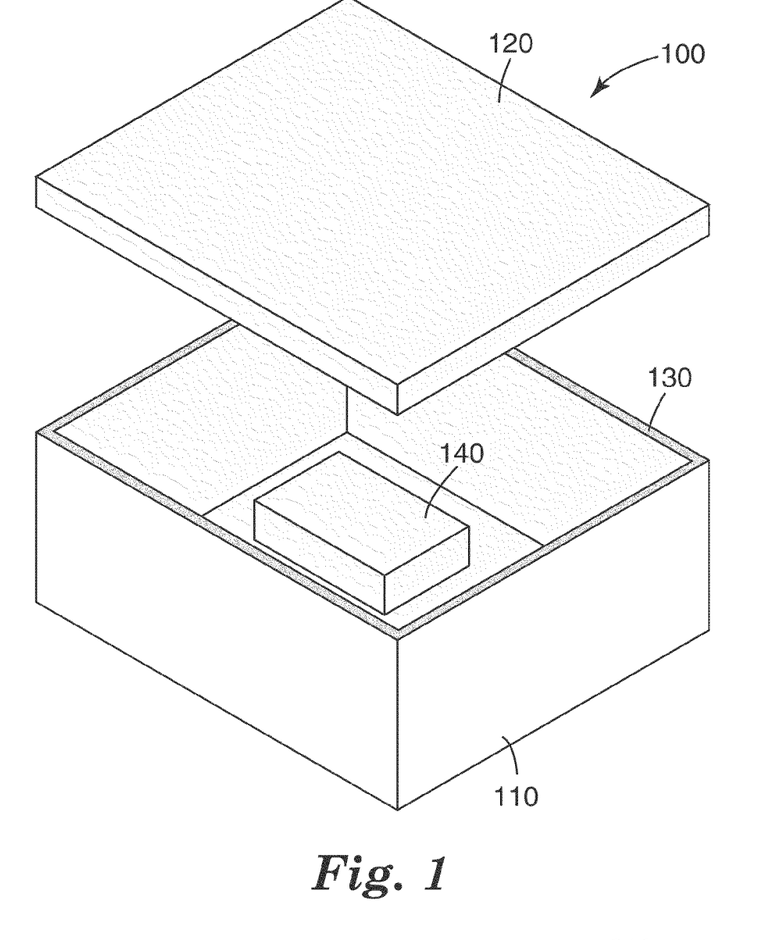
FIG. 1 illustrates an exemplary inert gas environment.

Enclosures containing a gas environment are used in a wide variety of applications. The size and shape of the enclosure, and the nature of the materials used to form the enclosure may vary depending on the end use requirements including, e.g., the size and shape of the components contained within the enclosure, the space available for the enclosure, and the desired environment within the enclosure. Referring to FIG. 1, exemplary enclosure 100 comprises two sections, housing 110 and cover 120. Enclosure 100 contains component 140 and a gas environment.

Generally, an enclosure may comprise any number of sections connected by any known means including, e.g., mechanical fasteners (e.g., screws, bolts, rivets), welds, and/or adhesives. In some embodiments, a gasket may be positioned at the seams to reduce leaks. In some embodiments, the gasket may be an adhesive gasket, which is capable of connecting sections of the enclosure and sealing the resulting seam. Referring to FIG. 1, adhesive gasket 130 connects cover 120 to housing 110.

In some embodiments, the enclosure is filled with one or more inert gases. As used herein, an "inert" gas is one that exhibits substantially no chemical reaction with the components within the enclosure and other materials (e.g., gases) within the enclosure under typical use conditions (e.g., temperature and pressure). Any inert gas may be used. Exemplary inert gases include helium, neon, argon, krypton, and nitrogen. In some embodiments, a low-density inert gas (e.g., helium) is desirable.

In some embodiments, the enclosure is filled with one or more reactive gases. As used herein, a "reactive" gas is one that undergoes a reaction with at least one of the components within the enclosure, or other materials (e.g., gases) within the enclosure under typical use conditions (e.g., temperature and pressure). Any known reactive gas may be used. For example, a reductive gas may be used to react with oxidizing gases in the enclosure. In some embodiments, the use of a reductive gas to scavenge oxidizing gases will prolong the life of the components within the enclosure. Exemplary reactive gases include hydrogen, oxygen, carbon monoxide, formaldehyde, diborane, and ammonia. In some embodiments, the reactive gas is not hydrogen.

Generally, any known gas may be used depending, e.g., on the desired environment within the enclosure. In some embodiments, an inert gas (e.g., helium) may be used. In some embodiments, a reactive (e.g., a reductive) gas may be used.

A particular gas may be inert in one application but reactive in another due to, e.g., changes in materials, temperature, or pressure. For example, in some embodiments, carbon dioxide may be an inert gas, while in other embodiments carbon dioxide may be a reactive gas.

Generally, the relative amount of a particular gas within an enclosure can be defined by the mole fraction of that gas (i.e., the number of moles of the particular gas relative to the total number of moles of gas) within the enclosure. In some embodiments, the relative amount of a particular gas within an enclosure may be expressed as the partial pressure of that gas within the enclosure, wherein the partial pressure of a gas is equal to mole fraction of that gas multiplied by the total pressure within the enclosure.

Generally, the relative amount of the desired gas(es) within an enclosure decreases over time, limiting the useful life of the components within the enclosure. For example, reactive gases will be consumed over time, ambient gases may leak or diffuse into the enclosure, and/or desired gases may leak or diffuse out of the enclosure. The depletion rate of a particular gas within an enclosure is defined as the rate at which the relative amount of that gas decreases with time (e.g., the rate at which the partial pressure of that gas decreases with time). Generally, the depletion rate will increase with, e.g., an increase in the rates at which the particular gas leaks and/or diffuses out of the enclosure, an increase in the rates at which other gases leak or diffuse into the enclosure, and, for reactive gases, an increase in the rate at which the particular gas reacts.

The depletion rate of a particular gas within an enclosure is also affected by its replenishment rate, i.e., the rate at which the particular gas is replenished. In some embodiments of the present invention, the desired gas within the enclosure is internally replenished by positioning a gas source within the enclosure. In some embodiments of the present invention, the desired gas within the enclosure is internally replenished by positioning a gas source between sections of the enclosure. This gas source comprises one or more gases contained within a permeable membrane.

Figure 2A:
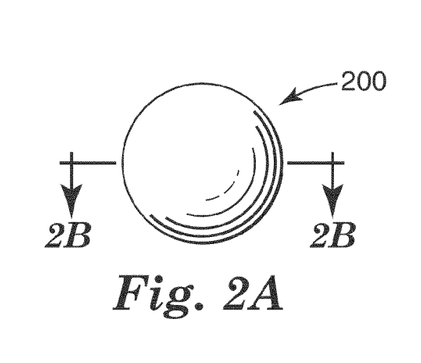
FIG. 2A illustrates a gas source in accordance with an embodiment of the present invention.
Figure 2B:
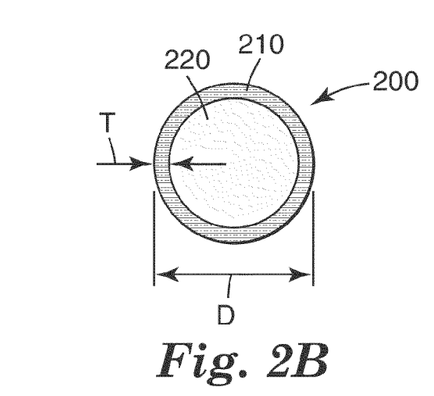
FIG. 2B illustrates a cross-sectional view of the gas source of FIG. 2A.

Referring to FIGS. 2A and 2B, one embodiment of a gas source of the present invention is illustrated. Bubble 200 comprises membrane 210 having a mean thickness T, and a mean diameter D. One or more gases are stored within cavity 220.

In order to maximize the amount of gas available for replenishment at a given volume of bubbles, the gas may be stored within the bubbles at elevated pressure. In some embodiments, the storage pressure is at least about 200 kPa (29 psi) (in some embodiments, at least about 1000 kPa (145 psi), at least about 1725 kPa (250 psi), or even at least about 2750 kPa (400 psi)).

Generally, bubbles may be of any shape, size (e.g., mean diameter), size distribution, volume, membrane thickness, density, and aspect ratio (ratio of mean diameter to mean wall thickness for a spherical bubble).

The bubbles can have arbitrary shapes. In some embodiments, the bubbles are substantially spherical so as to withstand maximum internal pressures. Other shapes include any geometric three dimensional polygon with arbitrary numbers of sides including, e.g., cubes, cylinders, hemispheres, hemicylinders, pyramids, and the like.

In some embodiments, the bubbles can have a distribution of sizes (e.g., diameters or volumes). In some embodiments, the distribution can be described by a particle size characterization function, e.g., Gaussian, Lorentzian, or log-normal. The distribution can be unimodal (including, e.g., only one size of particles) or multimodal (e.g., bimodal, trimodal, etc.). Generally, multimodal distributions provide increased packing density.

In some embodiments, the bubbles can have a median diameter (i.e., $50^{th}$ percentile) of at least about 1 micrometer (μm) (in some embodiments, at least about 5 μm, at least about 10 μm, or even at least about 20 μm). In some embodiments, the bubbles can have an average size of at less than about 5000 μm (in some embodiments, less than about 1000 μm, less than about 500 μm, less than about 100 μm, or even less than about 50 μm). In some embodiments, the bubbles have an average internal volume per bubble of at least about 50 cubic micrometers (in some embodiments, at least about 250 cubic micrometers, or even at least about 500 cubic micrometers). In some embodiments, the bubbles have an average volume of less than about one billion cubic micrometers (in some embodiments, less than about 250 million cubic micrometers, or less than 50 million cubic micrometers, or even less than 5 million cubic micrometers).

In general, membrane 210 may comprise any material(s) provided it is permeable to the gas stored within the bubble at use conditions (e.g., temperature). Exemplary membranes include glass, glass/ceramic, metal (e.g., Ti and Pd), metal oxide, multiple layers of metal and metal oxide, other metal compounds such as nitrides, carbides, and silicides, alloys, and polymeric materials. In some embodiments, the membrane comprises a plurality of layers of the same or different materials. Selection of the material(s) used for the membrane may depend on, e.g., permeability (i.e., rate of transport of the stored gas through the membrane), density, and mechanical properties (e.g., tensile strength, crush resistance).

Generally, the permeability of a gas through a particular membrane material can be determined by routine experimentation. (See, e.g., ASTM test methods D737-96 and D3985.) Permeation rates are also reported in the literature. (See, e.g., Vacuum Technology, Roth, A., North Holland Publishing Co., pages 164 and 166 (1976).) Generally, permeability may depend on, e.g., the composition of the membrane, the thickness of each layer, and the presence of pinholes, voids, or patterns in one or more of the layers.

In some embodiments, the average thickness of the membrane is at least 0.01 μm (in some embodiments, at least 0.1

µm, or even at least 0.5 µm). In some embodiments, the average thickness of the membrane is less than 20 µm (in some embodiments, less than 5.0 µm, or even less than 2.0 µm). In some embodiments, the bubbles can have a distribution of membrane thicknesses. In some embodiments, the average permeation rate of a plurality of bubbles can be controlled by adjusting the distribution of membrane thicknesses.

Glass bubbles can be made by any known method. (See, e.g., U.S. Pat. Nos. 3,365,315 and 4,767,726.) In addition, glass bubbles useful in the present invention are commercially available, including, e.g., those available under the trade name SCOTCHLITE Glass Bubbles from 3M Company, St. Paul, Minn. Ceramic bubbles are also commercially available including, e.g., those available from 3M Company under the trade names Z-LIGHT SPHERES and ZEEO-SPHERES.

In some embodiments, the permeability of a membrane may be adjusted by altering properties of the membrane. Generally, an increase in membrane thickness or density decreases permeability. Also, one or more layers may be applied to a surface of the membrane to reduce permeability. For example, inorganic materials (e.g., metals and/or metal oxides) may be applied to a glass or glass ceramic membrane. In some embodiments, metals such as gold, silver, copper, tin, zinc, aluminum, tungsten, chromium, zirconium, titanium, nickel, palladium and/or platinum may be used. Other useful materials include carbon and silicon and alloys containing metals and/or metalloids. In some embodiments, titanium nitride, tin oxide, or aluminum oxide may be used.

In some embodiments, the thickness of the layer(s) is at least about 0.2 nanometers (nm) (in some embodiments, at least about 0.3 nm, at least about 0.5 nm, or even at least about 1 nm). In some embodiments, the thickness of the layer(s) is less than about 20 nm (in some embodiments, less than about 10 nm, or less than about 5 nm, or even less than about 2 nm).

In some embodiments, voids or pinholes may be present in one or more layers. In some embodiments, one or more of the layers may be applied to only a portion of the membrane. In some embodiments, only a portion of the bubbles will have additional layers applied to the membrane. Generally, each of these properties may be adjusted to control the average permeation rate of a plurality of bubbles.

Any known method may be used to apply thin film layers of inorganic materials to glass bubbles (see, e.g., U.S. Pat. No. 4,618,525) including e.g., physical vapor deposition (sputter coating, evaporative coating, and cathodic arc deposition), chemical vapor deposition, electroless plating, and wet chemical means such as sol-gel coating. Commercially available coated glass bubbles include, e.g., those available under the trade name CONDUCT-O-FILL from Potters Industries, Inc., Valley Forge, Pa.

In some embodiments, the surface of a bubble may be treated with, e.g., organic materials, e.g., epoxy silane and methacrylate chromic chloride. Exemplary surface treated bubbles include those available from 3M Company under the trade name SCOTCHLITE Glass Bubbles (e.g., D32/4500, H20/1000, and A20/1000).

The gas source may be incorporated in the enclosure by any known means. In some embodiments, bubbles may be placed loose within the enclosure. In some embodiments, the bubbles may be placed in a permeable container, e.g., a polymeric bag or pouch, and the pouch placed within the enclosure. In some embodiments, the polymeric pouch may be coated with, e.g., a metal or metal oxide, to control the rate of permeability of the inert gas through the walls of the pouch.

In some embodiments, the bubbles may be incorporated with a resin. In some embodiments, the bubbles may be adhered to the surface of a resin and/or partially encapsulated in the resin. In some embodiments, a portion of the bubbles may be fully encapsulated in the resin. In some embodiments, substantially all (e.g., greater than 90% by weight, in some embodiments, greater than 95%, or even greater than 99%) of the bubbles may be fully encapsulated in the resin.

Generally, any known resin may be used. In some embodiments, the resin may be selected to control the rate of permeation of gas from the interior of the bubbles, through the resin, to the interior of the enclosure. Exemplary resins include acrylates, methacrylates, epoxies, silicones, olefins, and polyesters. The resin may be thermoplastic, thermosetting, elastomeric, or a thermoplastic elastomer. In some embodiments, a highly crosslinked resin (e.g., an epoxy) may be used. In some embodiments, highly crystalline resins (e.g., polyethylene and ethylene vinyl alcohol) may be used. The resin may be curable by, e.g., moisture, heat, actinic radiation (e.g., visible light, UV), or e-beam.

The bubbles may be incorporated into the resin by any known means including, e.g., mixing the bubbles into a melted resin or a solution (e.g., an aqueous or solvent solution) of the resin. In some embodiments, the bubbles may be milled with a resin using, e.g., a two-roll mill. In some embodiments, the bubbles may be added to an extruder and compounded with the resin. In some embodiments, the bubbles may be added to a pre-polymeric mixture that is subsequently polymerized to form the resin.

In some embodiments, the resin may be an adhesive. In some embodiments, the bubble-filled adhesive may be used to connect parts within the enclosure, and/or to connect sections of the enclosure. In some embodiments, the resin may be used to form a gasket used with the enclosure (e.g., placed between sections of the enclosure). In some embodiments, the bubble-containing resin may be applied (e.g., coated) on to one or more interior surfaces of the enclosure. In some embodiments, the resin may be applied to one or more surfaces of a component within the enclosure.

Figure 3:
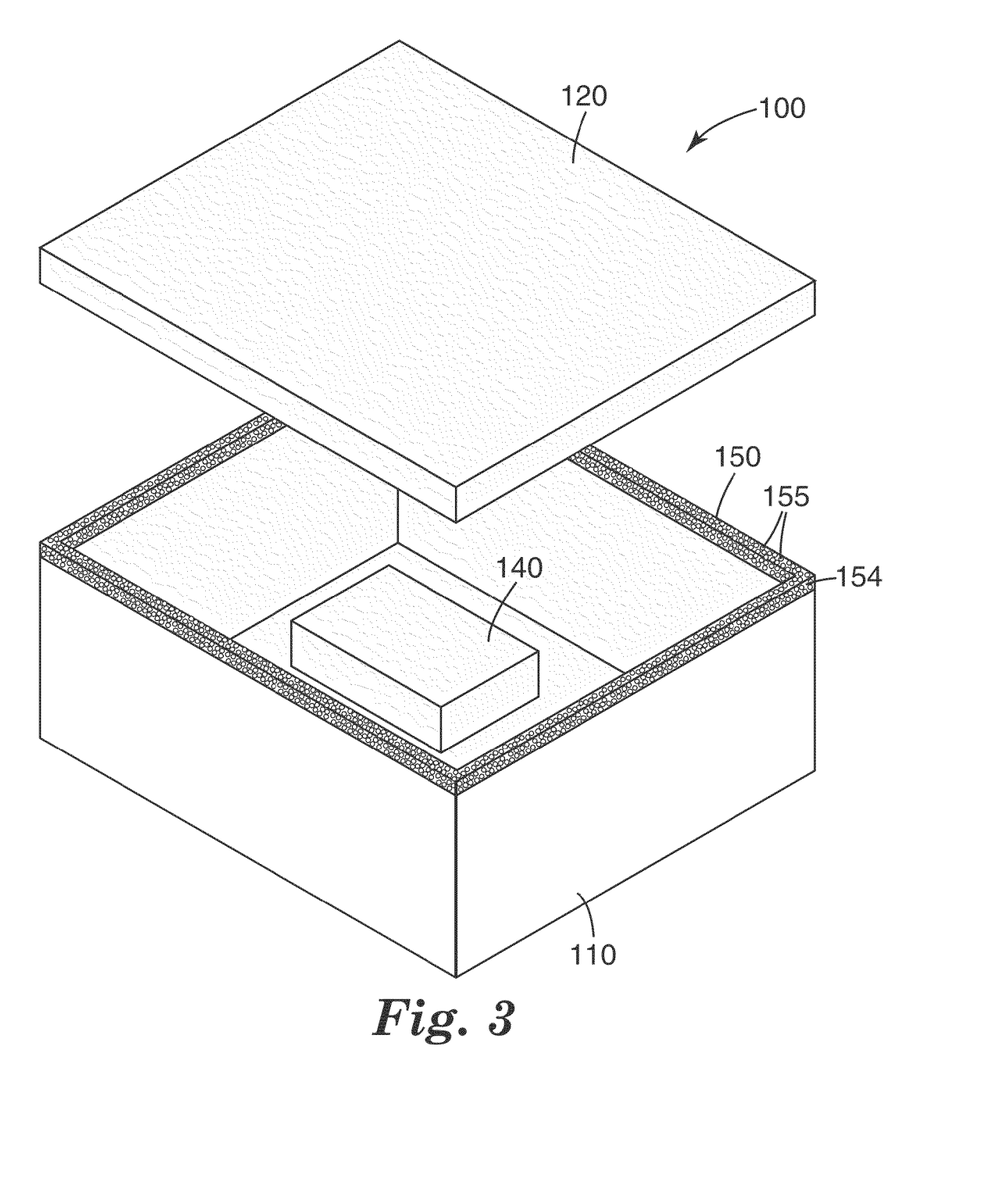
FIG. 3 illustrates an exemplary internally replenished enclosure according to some embodiments of the present disclosure.

Referring to FIG. 3, exemplary internally replenished enclosure 100 according to some embodiments of the present disclosure is shown. Enclosure 100 includes two sections, housing 110 and cover 120. When assembled, material 150, comprising plurality of bubbles 155 dispersed in resin 154 is located between these two sections. In some embodiments, resin 154 may be an adhesive and material 150 will connect cover 120 and housing 110. In some embodiments, material 150 is a gasket.

Figure 4:
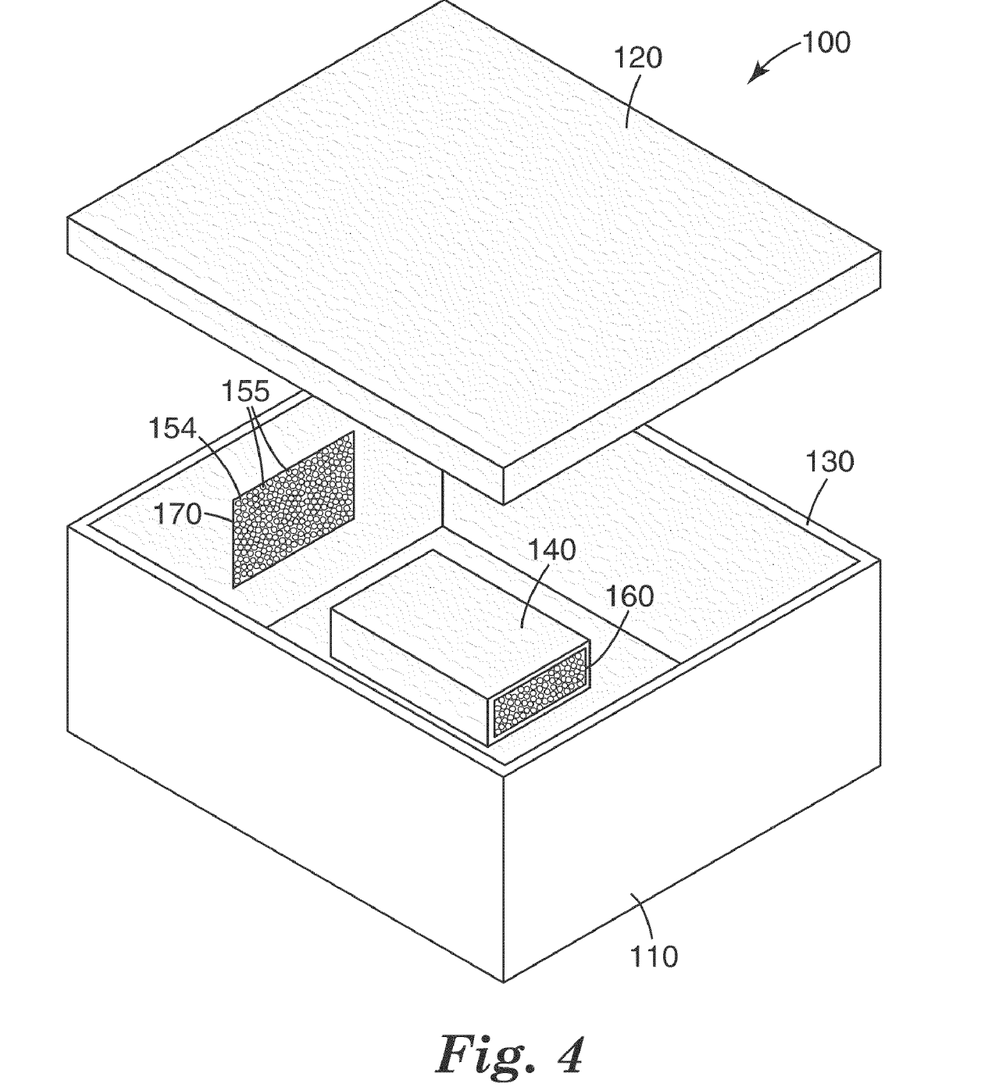
FIG. 4 illustrates another exemplary internally replenished enclosure according to some embodiments of the present disclosure.

Referring to FIG. 4, another exemplary internally replenished enclosure 100 according to some embodiments of the present disclosure is shown. Again, enclosure 100 includes two sections, housing 110 and cover 120. In some embodiments, plurality of bubbles 155 is dispersed in resin 154. In some embodiments, this combination of bubbles 155 dispersed in resin 154 may be applied as coating 170 to an interior wall of the enclosure. In some embodiments, this combination of bubbles dispersed in resin may be applied as coating 160 to component 140 located within the enclosure.

In addition to the bubbles, the resin may include other materials including, e.g., silica, talc, carbon black, electrically and/or thermally conductive particles, rheology modifiers (e.g., thixotropic agents), tackifiers, plasticizers, foaming agents, fibers, solid and/or hollow beads, dyes, and/or pigments.

In some embodiments, gas may be stored in a permeable container, e.g., a pouch, and the pouch may be placed in the enclosure. The pouch may comprise a coated or uncoated polymer film. Coatings include organic and inorganic (e.g., metal and/or metal oxide) materials.

The replenishment rate provided by a gas source comprising the desired gas contained within a permeable membrane is a function of a variety of parameters including, e.g., the average permeability of the membrane, the total volume of desired gas contained within the permeable membrane, the partial pressure of the desired gas in the enclosure, the resin in which the gas-containing permeable membrane is enclosed, if any, and the temperature and pressure within the enclosure. Generally, the replenishment rate may vary with time as the desired gas diffuses through the permeable membrane.

In some embodiments, it may be desirable to provide a gas source having a replenishment rate sufficient to substantially prevent depletion of the desired gas within the enclosure, i.e., the replenishment rate should be greater than or equal to the sum of the rates at which the desired gas is removed from the enclosure by, e.g., reaction, leaking and/or diffusion.

In some embodiments, it may be desirable to provide a gas source having a replenishment rate sufficient to maintain the relative amount (e.g., the partial pressure) of the desired gas within the enclosure at a desired level relative to its initial relative amount. In some embodiments, the replenishment rate should be sufficient to maintain the partial pressure of the desired gas within the enclosure at least 20% of its initial partial pressure, in some embodiments at least 50%, and, in some embodiments, at least 75%, or even at least 90% of its initial partial pressure.

In some embodiments, the partial pressure of the desired gas within the enclosure should be maintained for the working life of the components within the enclosure. In some embodiments, the partial pressure of the desired gas within the enclosure should be maintained for at least one year, in some embodiments, at least two years, in some embodiments, at least three years, and even at least five years, or even longer.

EXAMPLES

The following specific, but non-limiting, examples will serve to illustrate the invention. All percentages are by weight unless otherwise indicated.

Uncoated Bubbles

Bubbles available under the tradename SCOTCHLITE Glass Bubbles S60/10,000 from 3M Company were used. The glass is reported to be 70-80% $SiO_2$, 8-15% CaO, 3-8% $Na_2O$, and 2-6% $B_2O_3$. The average bubble density is reported to be 0.60 +/− 0.02 g/cc, with a median diameter (i.e., $50^{th}$ percentile) of 30 micrometers, an average wall thickness of 1.3 micrometers and an internal diameter of 28 micrometers.

Aluminum Coated Bubbles

A sample of uncoated bubbles was coated with a thin (approximately 1000 Angstrom) layer of aluminum. The bubbles were agitated while being coated with a flux of metal atoms from a sputtering source. Next, a film of aluminum oxide was deposited upon the aluminum layer via reactive sputter-deposition involving the concurrent addition of oxygen during aluminum sputtering. The density of the coated bubbles was 0.65 g/cm³.

Gas Filling

Both uncoated and aluminum coated bubbles were filled. In the following examples, the coated bubbles were filled after the coatings had been applied. Generally, bubbles may be filled with gas either before or after one or more coatings have been applied.

Approximately seventy grams of bubbles were loaded into an autoclave that was then sealed and evacuated of air. The autoclave was pressurized with helium gas to 6.9 megapascals (MPa) (1000 pounds per square inch (psi)) and heated to 300° C. Once the temperature reached 300° C., the pressure of the helium gas was charged in 6.9 MPa (1000 psi) increments and held at each increment for one hour. When a pressure of 48 MPa (7000 psi) was reached, the system was held constant for three hours. The autoclave was then cooled and vented, and the bubbles were removed from the autoclave.

One estimate of the pressure of the gas within the bubbles can be calculated using the ideal gas law (i.e., $P_1/T_1 = P_2/T_2$). Thus, with $P_1$=48 MPa, $T_1$=573 K (300° C.) and $T_2$=298 K (25° C.), the pressure within the bubbles at ambient temperature, $P_2$, is calculated to be 25 MPa (3640 psi).

Bubble Permeability

The amount of gas released from the glass bubbles by permeation through the bubble membrane was measured using gas chromatography. Both coated and uncoated bubbles were tested at ambient and elevated temperatures. To minimize helium loss prior to testing, all bubbles were stored at −20° C. after being removed from the autoclave until selected for testing. A summary of the samples is presented in Table 1.

TABLE 1

| Example | Coating | Temperature | Mass (g) |
|---------|---------|-------------|----------|
| 1 | none | 21° C. | 50.1 |
| 2 | none | 70° C. | 50.6 |
| 3 | aluminum | 21° C. | 60.6 |
| 4 | aluminum | 70° C. | 60.6 |

For each example, the bubbles were weighed into a 2.54 cm×2.54 cm (1 inch×1 inch) plastic weighing boat, which was then placed into a containment tube containing ambient air. The volume of the containment tube was approximately 600 mL. The joints of the tube were sealed with high-vacuum grease. Examples 1 and 3 were held at ambient temperature (21° C.), while Examples 2 and 4 were placed in a 70° C. oven.

Gas chromatography (GC) was used to monitor the change in composition of the atmosphere inside the containment tube. Periodically, small portions of the atmosphere inside the containment tube were removed and stored in a sample vessel. Prior to sampling, the tubes held at elevated temperatures were removed from the oven and allowed to cool to room temperature for about 30 minutes. Each sample vessel was connected to the sampling port of the gas chromatograph via a cone and socket joint. The operating parameters for the GC analysis are presented in Table 2. The volume of gas that permeated out of the bubbles per gram of bubbles is shown in Tables 3 and 4.

TABLE 2

| Instrument | HP 5890 GC obtained from Agilent Technologies |
|---|---|
| Carrier gas | Argon (approximately 3 mL/min) |
| Column | 5 Angstrom 25 m × 0.32 mm molecular sieve obtained from Chrompack Inc., Raritan, New Jersey |
| Head pressure | 0.083 MPa (12 psi) |
| Injection liner | 2 mm inside diameter (held at 180° C.) |
| Split flow | 50 mL/min |
| Oven program | 40° C. for two minutes then increased to 100° C. at 10° C./min |
| Detection | thermal conductivity (measured at 220° C.) |

TABLE 3

Permeation for uncoated bubbles

| | Milliliters of helium per gram of bubbles | |
|---|---|---|
| Time (hrs) | Example 1 | Example 2 |
| 0 | 0 | — |
| 3 | 6 | 33 |
| 21 | 29 | 98 |
| 46 | 46 | 124 |
| 119 | 73 | 159 |
| 171 | 84 | 172 |
| 216 | 90 | — |
| 218 | — | 179 |
| 293 | — | 190 |
| 294 | 99 | — |
| 389 | 107 | 192 |
| 485 | 114 | 199 |
| 696 | 124 | 202 |

TABLE 4

Permeation for coated bubbles

| | Milliliters of helium per gram of bubbles | |
|---|---|---|
| Time (hrs) | Example 3 | Example 4 |
| 0 | 0 | 0 |
| 14 | 2 | 12 |
| 45 | 5 | 28 |
| 61 | 6 | 35 |
| 88 | 8 | — |
| 91 | — | 44 |
| 166 | 13 | — |
| 167 | — | 60 |
| 261 | 17 | — |
| 262 | — | 74 |
| 357 | 21 | — |
| 358 | — | 83 |
| 569 | 27 | — |
| 570 | — | 102 |

Actual Volume of Gas Inside the Bubbles

Method 1: Gas Chromatography

A sample of helium-filled uncoated bubbles was placed in a containment tube as described above. The containment tube and bubbles were placed in a 150° C. oven for one week. The tube was then removed from the oven, allowed to cool to room temperature, and the atmosphere within the tube analyzed using GC, as described above. The bubbles were found to contain 250 mL of helium per gram of bubbles.

Similarly, a sample of helium-filled uncoated bubbles was placed in a containment tube and placed in a 600° C. oven for ten minutes. The tube was then removed from the oven, allowed to cool to room temperature, and the atmosphere within the tube analyzed using GC, as described above. The bubbles contain 191 mL of helium per gram of bubbles.

Method 2: Isostatic Crush Test

To determine the amount of helium contained inside the bubbles, 0.364 grams (g) of bubbles were placed into a balloon (#1032 latex balloon obtained from National Latex Products) containing 3.5 g of glycerol (analytical grade glycerol obtained from EM Science Corp.). The initial volume of the balloon filled with the bubbles and glycerol was measured by immersion in 10W-30 engine oil contained in a graduated cylinder. Next, the balloon and its contents were subjected to sufficient isostactic pressure (138 MPa (20,000 psi)) to fracture the bubbles releasing the helium stored inside. The increase in volume of the balloon was determined by measuring the displacement of the oil in the graduated cylinder.

Two samples of helium-filled glass bubbles were tested. The first sample, which was tested within one hour after being removed from the autoclave, contained 18 mL of helium in a 0.417 g sample (43.2 mL/g). Based on this volume, the pressure inside the filled bubbles was calculated to be 2.74 MPa (397 psi). The second sample, which was tested 24 hours after being removed from the autoclave, contained 8 mL of helium in a 0.364 g sample (22.0 mL/g). The pressure inside the filled bubbles was calculated to be 1.76 MPa (255 psi).

Various modifications and alterations of this invention will become apparent to those skilled in the art without departing from the scope and spirit of this invention. All publications and patents cited herein are incorporated by reference to the same extent as if each individual publication or patent was specifically and individually indicated to be incorporated by reference.

What is claimed is:

1. An internally replenished enclosure comprising a first gas having an initial partial pressure in the enclosure, and a replenishing gas source internal to the enclosure, the gas source comprising the first gas contained within a permeable membrane, wherein the gas source comprises a plurality of bubbles, and wherein at least a portion of the plurality of bubbles are encapsulated in a resin.

2. The enclosure of claim 1, wherein the permeable membrane comprises at least one of glass, ceramic, or a combination thereof.

3. The enclosure of claim 2, wherein the permeable membrane further comprises at least one of a metal and a metal oxide.

4. The enclosure of claim 1, wherein the permeable membrane comprises a metal, a metal oxide, or a combination thereof.

5. The enclosure of claim 1, wherein the permeable membrane comprises a polymeric film and at least one of a metal and a metal oxide.

6. The enclosure of claim 1, wherein the gas is an inert gas.

7. The enclosure of claim 1, wherein the gas is a reactive gas.

8. The enclosure of claim 1, wherein the plurality of bubbles has a median diameter of less than 500 μm.

9. The enclosure of claim 1, wherein the permeable membrane comprises (a) glass, (b) glass/ceramic, or (c) glass or glass/ceramic and a metal, a metal oxide, or a combination thereof bonded to an exterior surface of the glass or glass/ceramic.

10. The enclosure of claim 1, wherein the resin is applied to a portion of at least one interior surface of the enclosure.

11. The enclosure of claim 1, wherein the resin is applied to a component within the enclosure.

12. The enclosure of claim 1, wherein the gas source has a replenishment rate sufficient to maintain the partial pressure of the first gas at least 75% of the initial partial pressure of the first gas of at least two years.

13. The enclosure of claim 1, wherein the plurality of bubbles has
   (a) a distribution of membrane thicknesses;
   (b) a distribution of diameters; or
   (c) a combination thereof.

14. The enclosure of claim 1, wherein the plurality of bubbles comprises substantially spherical bubbles.

15. A method of internally replenishing an enclosure comprising providing an enclosure containing a first gas having an initial partial pressure and positioning a gas source comprising the first gas contained within a permeable membrane inside the enclosure, wherein the enclosure comprises a plurality of sections, and wherein the gas source is positioned in an adhesive bonding two sections of the enclosure together or in a gasket located between two sections of the enclosure.

16. An internally replenished enclosure comprising a plurality of sections, a first gas having an initial partial pressure in the enclosure, and a replenishing gas source comprising a plurality of bubbles comprising the first gas contained within a permeable membrane, wherein at least a portion of the plurality of bubbles are encapsulated in a resin positioned between at least two sections of the enclosure.

17. The enclosure of claim 16, wherein the resin is an adhesive, and at least two sections are connected with the adhesive.

18. The enclosure of claim 16, wherein a gasket comprises the resin and the gasket separates at least two sections of the enclosure.

\* \* \* \* \*